US006331758B1

(12) United States Patent
Takanashi et al.

(10) Patent No.: US 6,331,758 B1
(45) Date of Patent: Dec. 18, 2001

(54) ELECTRIC HAND WITH CUSHIONING MECHANISM

(75) Inventors: Seiji Takanashi; Hiroshi Miyachi; Koichiro Kanda, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/655,453

(22) Filed: Sep. 5, 2000

(30) Foreign Application Priority Data

Oct. 12, 1999 (JP) .................................................. 11-289816

(51) Int. Cl.[7] .................................................. H05B 11/01
(52) U.S. Cl. ................. 318/560; 318/568.1; 318/568.11; 318/568.21; 414/749; 414/750; 414/755; 414/760
(58) Field of Search ................................. 318/568.1, 560, 318/568.11, 568.12, 568.13, 568.14, 568.15, 568.16, 568.17, 568.18, 568.19, 568.2, 568.21; 414/749, 760

(56) References Cited

U.S. PATENT DOCUMENTS

| 4,115,684 | * | 9/1978 | Lindbom | 219/124.22 |
| 5,115,178 | * | 5/1992 | Umeda | 318/568.11 |
| 5,198,736 | * | 3/1993 | Azuma et al. | 318/568.1 |
| 5,928,120 | * | 7/1999 | Kameyama | 483/38 |
| 5,934,162 | * | 8/1999 | Habemehl | 81/434 |
| 6,059,516 | * | 5/2000 | Genov et al. | 414/744.5 |
| 6,116,118 | * | 9/2000 | Wesch, Jr. | 81/57.34 |
| 6,121,743 | * | 9/2000 | Genov et al. | 318/568.11 |

FOREIGN PATENT DOCUMENTS 2000-23391A * 8/2000 (JP) .................................................. B25J/15/08

* cited by examiner

*Primary Examiner*—Robert E. Nappi
*Assistant Examiner*—Tyrone Smith
(74) *Attorney, Agent, or Firm*—Oblon, Spivak, McClelland, Maier & Neustadt, P.C.

(57) ABSTRACT

An inertial force applied to a motor drive shaft when jaw members stop at opening and closing ends, grasping positions of a workpiece, and the like is absorbed and damage to motor parts such as gears due to impact is prevented. For this purpose, in an electric hand in which a pair of cam grooves 15, 15 are provided to a cam member 12 mounted to the drive shaft $3a$ of an electric motor 3, drive pins 13 fitted into the cam grooves 15, 15 are respectively provided to the pair of jaw members 2, 2 for grasping the workpiece, and a reciprocating rotating motion of the drive shaft $3a$ is converted to opening/closing motions of the jaw members 2, 2 by the cam member 12 and the drive pins 13, an inner cylinder member 18 mounted to the drive shaft $3a$ and an outer cylinder member 19 provided to the cam member 12 and fitted with the inner cylinder member 18 such that the outer cylinder member 19 can rotate with respect to the inner cylinder member 18 are connected through a plurality of elastic bodies 20 and impact that acts on the drive shaft $3a$ when the cam member 12 stops at swinging ends is absorbed by elastic deformation of the elastic bodies 20.

4 Claims, 4 Drawing Sheets

FIG. 4
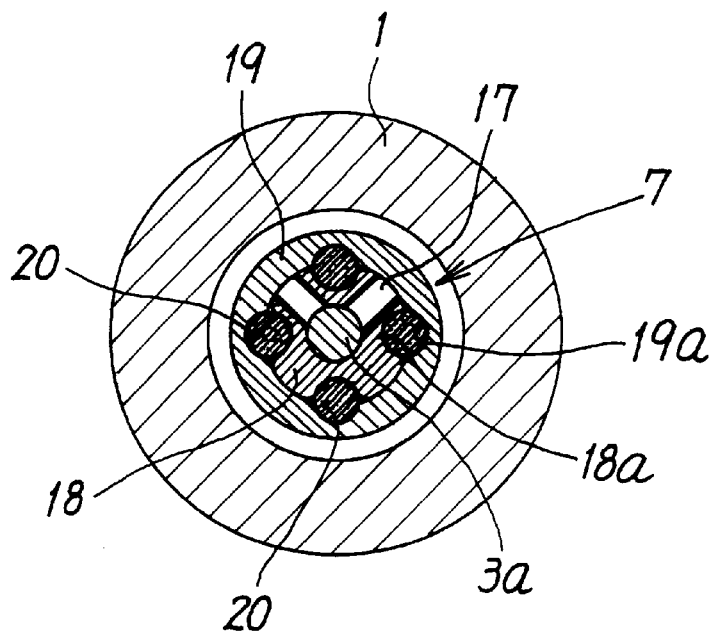
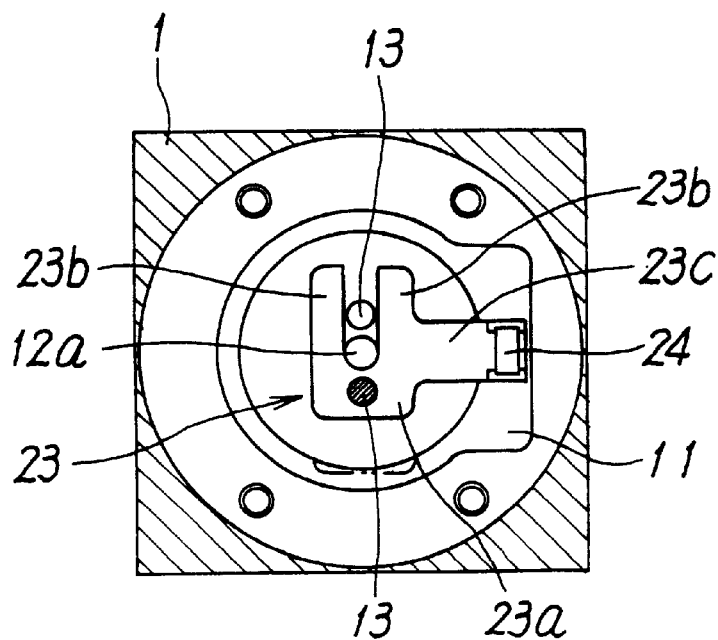

ELECTRIC HAND WITH CUSHIONING MECHANISM

TECHNICAL FIELD

The present invention relates to an electric hand in which a pair of jaw members for grasping a workpiece are opened and closed by an electric motor and more specifically to an electric hand with a cushioning function in which application of impact to a motor drive shaft is prevented when the jaw members stop at opening and closing ends, grasping positions of the workpiece, and the like.

PRIOR ART

A hand for grasping a workpiece between a pair of jaw members that can be opened and closed is generally formed such that the jaw members are opened and closed by an air cylinder.

However, because a prior-art hand with such a structure requires accompanying equipment such as air piping for the air cylinder and a direction selector valve for controlling supplying/discharging of compressed air to and from the piping and the number of parts constituting the hand itself increases. Therefore, miniaturization of the hand is difficult and it is also difficult to make an entire system compact, the system including the accompanying equipment for allowing operation of the hand.

To solve the above problems, the present inventors proposed an electric hand in which a pair of jaw members for grasping a workpiece were opened and closed by an electric motor (Japanese Patent Application No. 10-357778). In this electric hand, a converting mechanism for which a cam is used is provided between a drive shaft of the electric motor and the jaw members and a reciprocating rotating motion of the drive shaft is converted to opening/closing motions of the jaw members by the converting mechanism.

In such an electric hand, a motor with a speed reducer having a plurality of gears is used as the electric motor in order to increase force for grasping the workpiece by the jaw members. If such a motor with gears is used, a large inertial force due to a rotor of the motor acts when the jaw members stop at opening and closing ends, grasping positions of the workpiece, and the like and the gears of the speed reducer may be damaged by impact.

DISCLOSURE OF THE INVENTION

It is a technical object of the present invention to provide an electric hand in which jaw members for grasping a workpiece are opened and closed by a motor, wherein an inertial force applied to a motor drive shaft when the jaw members stop at opening and closing ends, grasping positions of the workpiece, and the like can be absorbed and damage to motor parts such as gears due to impact is prevented.

To achieve the above object, an electric hand of the present invention comprises a pair of jaw members that are for grasping a workpiece and can be opened and closed, an electric motor having a rotating drive shaft, and a converting mechanism disposed between the drive shaft and the jaw members for converting a reciprocating rotating motion of the drive shaft to opening/closing motions of the jaw members, wherein the converting mechanism has a cam member mounted to the drive shaft of the electric motor, a pair of cam grooves formed in the cam member, and pins respectively mounted to the respective jaw members, respectively fitted into the respective cam grooves, and displaced in the cam grooves in an opening/closing direction of the jaw members by reciprocating rotation of the cam member, and cushioning means for absorbing impact that acts on the drive shaft when the cam member stops at swinging ends is provided between the drive shaft and the cam member.

According to a concrete embodiment of the invention, the cushioning means includes an inner cylinder member with a small diameter that is mounted to the drive shaft, an outer cylinder member with a large diameter that is provided to the cam member and fitted with the inner cylinder member such that the outer cylinder member can rotate with respect to the inner cylinder member, and an elastic body that is engaged with the inner cylinder member and the outer cylinder member between both the members and has a function of connecting both the members and a function of absorbing impact.

More specifically, arc-shaped depressions are formed in a plurality of positions facing each other on an inner face of the outer cylinder member and an outer face of the inner cylinder member and the elastic body having a columnar shape is housed in each of the depressions. In this case, it is preferable that each the depression in the inner cylinder member has a larger radius of curvature than each the depression in the outer cylinder member and edge portions of each the depression in the inner cylinder member are rounded.

BRIEF DESCRIPTION OF THE DRAWINGS

FIG. 4 is a sectional view taken along a line B—B in FIG. 1.

FIG. 5 is a sectional view taken along a line C—C in FIG. 2.

DETAILED DESCRIPTION

Figure 1:
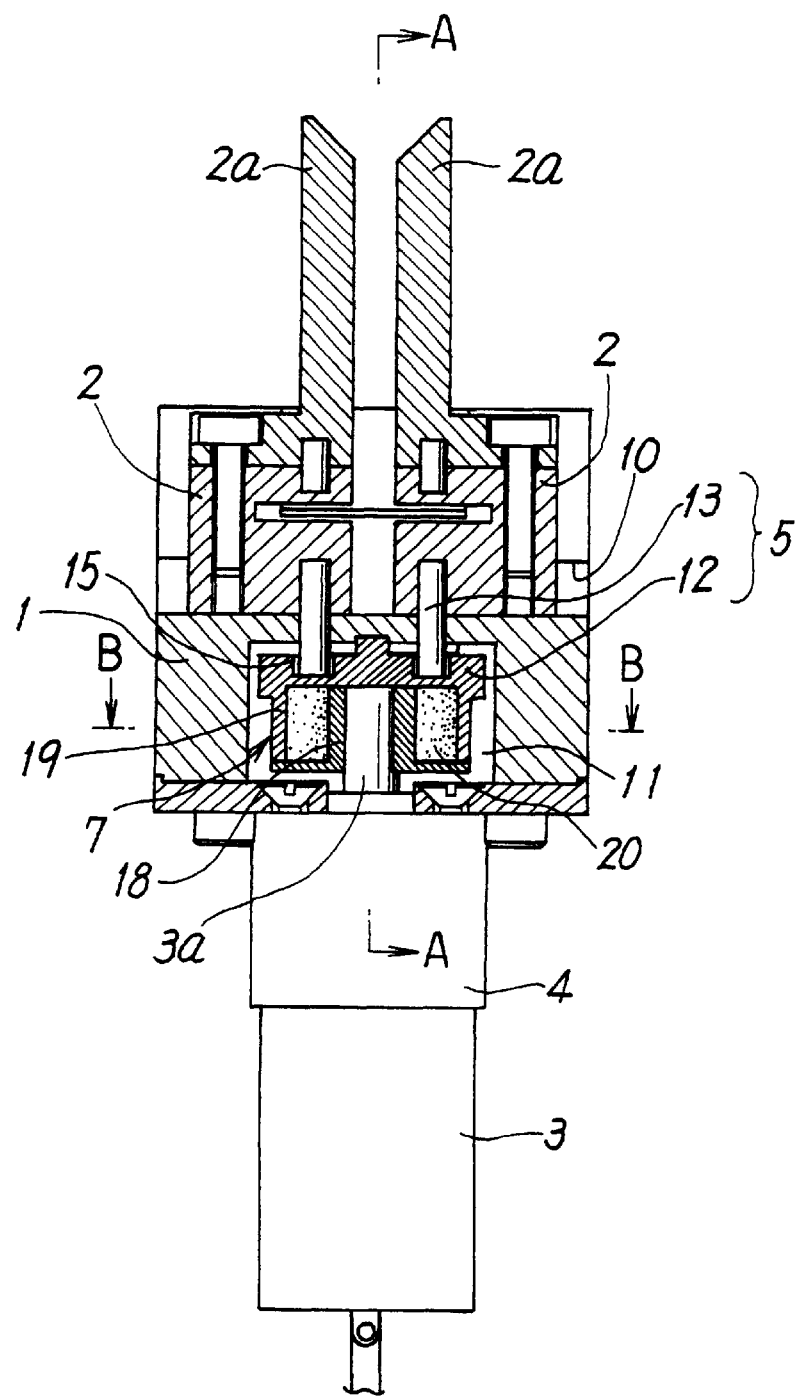
FIG. 1 is a sectional view showing an embodiment of an electric hand according to the present invention.

FIGS. 1 to 5 show a representative embodiment of an electric hand according to the present invention. The electric hand includes a pair of jaw members 2, 2 that grasp a workpiece and can be opened and closed, an electric motor 3 with a speed reducer 4, a converting mechanism 5 for converting a reciprocating rotating motion of a drive shaft 3a of the electric motor 3 to opening/closing motions of the jaw members 2, 2, a position detecting mechanism 6 for detecting operating positions of the jaw members 2, 2, and a housing 1 to which the above respective members and mechanisms are mounted.

The jaw members 2, 2 have substantially T-shaped sectional shapes, are fitted for sliding in a guide groove 10 formed in the housing 1, and are opened and closed linearly along the guide groove 10. By attachments 2a, 2a mounted to the respective jaw members 2, 2, the workpiece is grasped.

The electric motor 3 has the speed reducer 4 including a speed reducing mechanism formed of a plurality of gears, a speed of rotation of a rotor is reduced by the speed reducer 4, and the rotation is transmitted to the drive shaft 3a. The drive shaft 3a projects into a recessed portion 11 formed in the housing 1 and a cam member 12 out of the cam member 12 and drive pins 13 constituting the converting mechanism 5 is mounted to a tip end of the drive shaft 3a through cushioning means 7.

Figure 3:
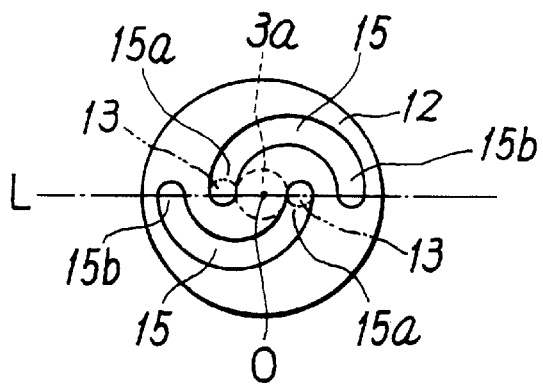
FIG. 3 is a plan view of a cam member.

The cam member 12 has a circular shape in a plan view as is clear from FIG. 3, the drive shaft 3a is fixed to a central portion of the cam member 12, and a pair of cam grooves 15, 15 in semicircular shapes are provided symmetrically to an outer face of the cam member 12. The cam grooves 15, 15 are disposed such that opposite ends 15a and 15b of each the cam groove 15 are positioned on a straight line L passing through a rotation center O of the cam member 12 and on opposite sides of the rotation center O and that the one end 15a is in a position close to the rotation center O while the other end 15b is in a position at a distance from the rotation center O.

On the other hand, the drive pins 13 constituting the converting mechanism 5 are respectively fixed to positions of the respective jaw members 2, 2 close to inner ends and the drive pins 13 are respectively fitted into the respective cam grooves 15, 15.

If the cam member 12 is rotated counterclockwise by the motor 3 from a state in FIG. 3 in which the drive pins 13, 13 have moved to the inner ends 15a, 15a of the cam grooves 15, 15, the respective drive pines 13, 13 move to outer sides of the cam member 12 on the straight line L along the cam grooves 15, 15 through which the drive pines 13, 13 are displaced, thereby opening the pair of jaw members 2, 2. If the cam member 12 is rotated clockwise from the open state, the respective drive pines 13, 13 are drawn inward in the cam grooves 15, 15 to move toward the rotation center of the cam member 12, thereby closing the jaw members 2, 2.

Thus, by causing the cam member 12 to rotate in a reciprocating manner by the drive shaft 3a of the motor 3, the pair of jaw members 2, 2 are opened and closed to grasp the workpiece between the attachments 2a, 2a mounted to the respective jaw members 2, 2 and to release the grasped workpiece. When the jaw members 2, 2 stop at the opening and closing ends, the grasping positions of the workpiece, and the like, the large inertial force due to the rotor of the motor 3 acts on the drive shaft 3a. Therefore, in order to absorb the acting force, the cushioning means 7 is provided between the drive shaft 3a and the cam member 12.

As is clear from FIGS. 1 and 4, the cushioning means 7 is formed of an inner cylinder member 18 in a form of a cylindrical shape with a small diameter and fixed to the drive shaft 3a through screws 17, an outer cylinder member 19 in a cylindrical shape with a large diameter, formed integrally with the cam member 12, and fitted with the inner cylinder member 18 such that the outer cylinder member 19 and the inner cylinder member 18 can rotate with respect to each other, and elastic bodies 20 disposed between and engaged with the inner cylinder member 18 and the outer cylinder member 19. More specifically, depressions 18a and 19a in semicircular or arc shapes are formed in a plurality of positions facing each other on the inner face of the outer cylinder member 19 and the outer face of the inner cylinder member 18 and each the elastic body 20 formed into a columnar shape (including a cylinder) from elastic material such as polyurethane rubber is housed in a hole surrounded by the depressions 18a and 19a facing each other. A reference numeral 18b in the drawing designates a circular flange that is formed at an end portion of the inner cylinder member 18 and closes the end portions of the holes to prevent falling off of the elastic bodies 20.

Figure 6:
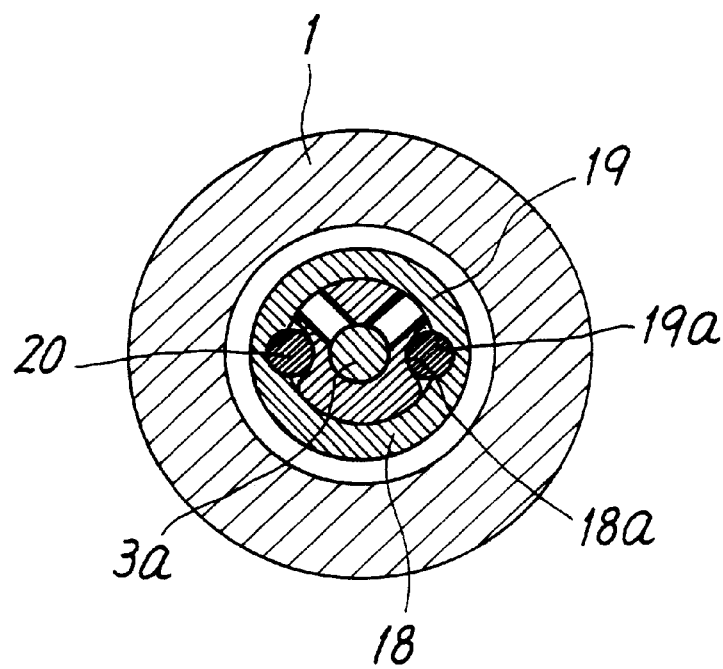
FIG. 6 is a sectional view in a similar position to FIG. 4 and showing a different structure example of the invention.

Here, it is preferable to round edge portions of left and right opposite ends of the respective depressions 18a and 19a as shown in the drawing. As a result, it is possible to prevent the elastic bodies 20 from being damaged due to their contact with sharp edge portions, thereby improving durability of the elastic bodies 20. The depressions 18a and 19a do not necessarily have to have the same shapes. For example, as shown in FIG. 6, the depression 19a in the outer cylinder member 19 may have the semicircular shape in which half of the elastic body 20 is housed and the depression 18a in the inner cylinder member 18 may have the arc shape having a larger radius of curvature than the depression 19a. If the depression 18a in the inner cylinder member 18 with the smaller diameter has the arc shape in this manner, it is possible to prevent the sharp edges from being formed on the left and right opposite ends of the depression 18a, thereby preventing damage to the elastic body 20.

By providing the cushioning means 7 between the drive shaft 3a and the cam member 12, although the cam member 12 stops with the jaw members 2, 2 when the jaw members 2, 2 stop at the opening and closing ends, grasping positions of the workpiece, and the like, the drive shaft 3a stops in a cushioned manner while elastically deforming the elastic bodies 20. Therefore, the inertial force due to the rotor of the motor 3 is absorbed and damage to motor parts such as the gears of the speed reducer 4 due to impact in stopping is prevented. As a result, it can be expected that durability as the hand is improved dramatically and that a life of the hand is increased by 100 times as compared with one without the cushioning means 7. Furthermore, because opening and closing speeds of the jaw members 2, 2 can be increase, operating efficiency is also improved.

On the other hand, in opening and closing operations of the jaw members 2, 2, the elastic bodies 20 are locked into the inner cylinder member 18 and the outer cylinder member 19 to connect them, thereby reliably transmitting rotation of the drive shaft 3a to the cam member 12. Therefore, the elastic bodies 20 have both the function of connecting the inner cylinder member 18 and the outer cylinder member 19 to transmit the rotation force and the function of absorbing the impact that acts on the drive shaft as described above.

Although the four sets of depressions 18a, 19a, and elastic bodies 20 are provided at regular angles about the rotation center of the drive shaft 3a in the embodiment shown in the drawings, the number of the sets may be two, three, five or more, or only one.

The shape of the elastic body 20 is not limited to the column and may be other shapes such as a prism and a sphere. In such a case, depressions in such shapes as to fit the shapes of the respective elastic bodies are provided between the inner face of the outer cylinder member 19 and the outer face of the inner cylinder member 18.

Figure 2:
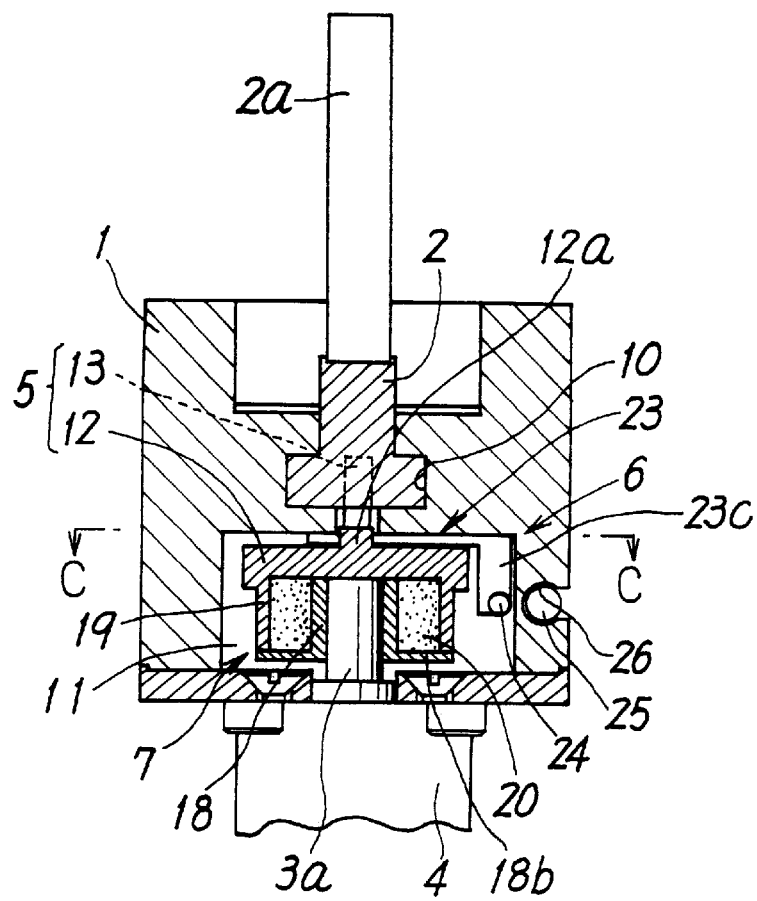
FIG. 2 is a sectional view taken along a line A—A in FIG. 1.

Furthermore, as can be seen from FIGS. 2 and 5, the position detecting mechanism 6 has a moving member 23 disposed between the jaw members 2 and the cam member 12 in a state in which the moving member 23 is mounted to the drive pin 13 of either one of the jaw members 2. The moving member 23 is formed of a base portion 23a mounted to the drive pin 13, a pair of movement guide portions 23b, 23b extending in parallel with each other from the base portion 23a such that a projection 12a on the cam member 12 is disposed between the movement guide portions 23b, 23b, and a mounting portion 23c extending sideways from one of the movement guide portions 23b and having a detected body 24 at its tip end. The mounting portion 23c is formed into a shape bent into a substantially L shape along an inner face of the recessed portion 11 of the housing 1 and is mounted with the detected body 23 at its tip end. The detected body 24 faces a mounting groove 26 for a position sensor 25 formed in an outer peripheral face of the housing 1.

The position sensor 25 is formed into a long and narrow columnar shape, inserted into a predetermined position in the mounting groove 26 having a circular sectional shape, and fixed by a screw. The position sensor 25 and the detected body 24 mounted to the moving member 23 constitute the position detecting mechanism 6.

Although a permanent magnet is used as the detected body 24 and a magnetism proximity switch for sensing proximity of a magnet that is the detected body 24 is used as the position sensor 25 in the embodiment shown in the drawings, the detected body 24 and the position sensor 25 are not limited to this and various members can be used as the detected body 24 and the position sensor 25. For example, the detected body 24 may be metal and the position sensor 25 may be a high frequency-oscillating proximity sensor.

As specifically described above, according to the electric hand of the invention, by providing the cushioning means between the drive shaft and the cam member, it is possible to absorb the inertial force that acts on the motor drive shaft when the jaw members stop at the opening and closing ends, grasping positions of the workpiece, and the like and to reliably prevent damage to the motor parts such as the gears due to the impact of the inertial force.

What is claimed is:

1. An electric hand with a cushioning function comprising a pair of jaw members that are for grasping a workpiece and can be opened and closed, an electric motor having a rotating drive shaft, and a converting mechanism disposed between said drive shaft and said jaw members for converting a reciprocating rotating motion of said drive shaft to opening/closing motions of said jaw members, wherein said converting mechanism has a cam member mounted to said drive shaft of said electric motor, a pair of cam grooves formed in said cam member, and drive pins respectively mounted to said respective jaw members, respectively fitted into said respective cam grooves, and displaced in said cam grooves in an opening/closing direction of said jaw members by reciprocating rotation of said cam member, and cushioning means for absorbing impact that acts on said drive shaft when said cam member stops at swinging ends is provided between said drive shaft and said cam member.

2. An electric hand according to claim 1, wherein said cushioning means includes an inner cylinder member with a small diameter that is mounted to said drive shaft, an outer cylinder member with a large diameter that is provided to said cam member and fitted with a periphery of said inner cylinder member such that said outer cylinder member can rotate with respect to said inner cylinder member, and an elastic body that is engaged with said inner cylinder member and said outer cylinder member between both said members and has a function of connecting both said members and a function of being elastically deformed to absorb impact.

3. An electric hand according to claim 2, wherein arc-shaped depressions are formed in a plurality of positions facing each other on an inner face of said outer cylinder member and an outer face of said inner cylinder member and said elastic body having a columnar shape is housed in each of said depressions.

4. An electric hand according to claim 3, wherein each said depression in said inner cylinder member has a larger radius of curvature than each said depression in said outer cylinder member and edge portions of each said depression in said inner cylinder member are rounded.

* * * * *